US012805626B2

(12) United States Patent
Aidan

(10) Patent No.: US 12,805,626 B2
(45) **Date of Patent: *Nov. 24, 2026**

(54) SMART MIRROR WITH MAKEUP LOOK SUPERIMPOSITION AND GUIDED TRACING

(71) Applicant: ELC MANAGEMENT LLC, Melville, NY (US)

(72) Inventor: Christopher Aidan, Austin, TX (US)

(73) Assignee: ELC MANAGEMENT LLC, Melville, NY (US)

( * ) Notice: Subject to any disclaimer, the term of this patent is extended or adjusted under 35 U.S.C. 154(b) by 303 days.

This patent is subject to a terminal disclaimer.

(21) Appl. No.: 18/444,382

(22) Filed: Feb. 16, 2024

(65) Prior Publication Data

US 2025/0261744 A1 Aug. 21, 2025

(51) Int. Cl.

*G06V 20/20* (2022.01)
*A45D 44/00* (2006.01)

(Continued)

(52) U.S. Cl.

CPC ......... *A45D 44/005* (2013.01); *G06V 10/141* (2022.01); *G06V 20/20* (2022.01); *G06V 40/171* (2022.01); *A45D 2044/007* (2013.01)

(58) Field of Classification Search

CPC ........... A45D 44/005; A45D 2044/007; G06V 10/141; G06V 20/20; G06V 40/171

See application file for complete search history.

(56) References Cited

U.S. PATENT DOCUMENTS

| | | |
|---|---|---|
| 9,582,889 B2 | 2/2017 | Deitch et al. |
| 10,395,436 B1 | 8/2019 | Shen et al. |

(Continued)

FOREIGN PATENT DOCUMENTS

| | | |
|---|---|---|
| JP | 2015072697 A * | 4/2015 |
| WO | 2022/146615 A1 | 7/2022 |
| WO | 2023/056333 A1 | 4/2023 |

OTHER PUBLICATIONS

De Almeida et al., Interactive makeup tutorial using face tracking and augmented reality on mobile devices. In 2015 XVII Symposium on Virtual and Augmented Reality, pp. 220-226, IEEE (May 2015).

(Continued)

*Primary Examiner* — Han Hoang

(74) *Attorney, Agent, or Firm* — MARSHALL, GERSTEIN & BORUN LLP

(57) ABSTRACT

An intelligent mirror device, and techniques for operating the device, are provided. The device may include a mirror with an integrated display component, a user interface, sensors configured to capture real-time data associated with the user's face, processors, and memories storing instructions that, when executed by the processors, cause the processors to: receive an indication of a makeup look selected by the user, analyze the real-time data associated with the user's face in order to generate a three-dimensional map associated with the user's face, identify facial features of the user's face on the three-dimensional map associated with the user's face; and cause the user interface to provide, via the integrated display component, guidance associated with applying cosmetic products to the user's facial features in order to achieve the makeup look selected by the user. The guidance may be at least partially superimposed upon the user's face in the mirror.

19 Claims, 5 Drawing Sheets

(51) Int. Cl.
*G06V 10/141* (2022.01)
*G06V 40/16* (2022.01)

(56) References Cited

U.S. PATENT DOCUMENTS

| | | | | |
|---|---|---|---|---|
| 10,810,902 | B2 | 10/2020 | Li et al. | |
| 11,580,682 | B1 * | 2/2023 | Luo | G06V 20/20 |
| 12,265,687 | B2 | 4/2025 | Karunamuni | |
| 2008/0245383 | A1 | 10/2008 | Tomandl | |
| 2014/0096801 | A1 | 4/2014 | Mccormick et al. | |
| 2015/0366328 | A1 | 12/2015 | Tamura et al. | |
| 2016/0199977 | A1 | 7/2016 | Breazeal | |
| 2016/0239187 | A1 | 8/2016 | Ben-Bassat | |
| 2019/0150636 | A1 | 5/2019 | Wright | |
| 2019/0164341 | A1 * | 5/2019 | Venkataraman | G06T 17/20 |
| 2019/0208887 | A1 | 7/2019 | Li et al. | |
| 2019/0208892 | A1 | 7/2019 | Li et al. | |
| 2020/0387942 | A1 | 12/2020 | Martin et al. | |
| 2021/0195713 | A1 | 6/2021 | Truong | |
| 2021/0274912 | A1 | 9/2021 | Geurts et al. | |
| 2022/0175114 | A1 | 6/2022 | Lin et al. | |
| 2022/0207802 | A1 | 6/2022 | Cruz et al. | |
| 2022/0211163 | A1 * | 7/2022 | Yang | G06V 10/56 |
| 2023/0101374 | A1 | 3/2023 | Kosecoff | |
| 2023/0147318 | A1 | 5/2023 | Bazinval et al. | |
| 2023/0277119 | A1 * | 9/2023 | Lewinson | G16H 40/63 600/306 |
| 2024/0065420 | A1 | 2/2024 | Iverson et al. | |
| 2024/0108119 | A1 | 4/2024 | Lee et al. | |
| 2024/0216159 | A1 | 7/2024 | Barbarino et al. | |
| 2024/0221061 | A1 | 7/2024 | Phung | |
| 2024/0245300 | A1 * | 7/2024 | Zarinabad Nooralipour | A61B 5/443 |
| 2024/0412463 | A1 | 12/2024 | Kips et al. | |
| 2025/0261744 | A1 | 8/2025 | Aidan | |
| 2026/0024445 | A1 | 1/2026 | Aidan | |

OTHER PUBLICATIONS

Treepong et al., The development of an augmented virtuality for interactive face makeup system. In International Conference on Advances in Computer Entertainment, pp. 614-625, Springer International Publishing (Dec. 2017).

Kitaguchi et al.: "Development and Validation of a 3-Dimensional Convolutional Neural Network for Automatic Surgical Skill Assessment . . . ", Jama Network, Submitted Aug. 13, 2021 [retrieved on Jul. 17, 2026], Retrieved from the internet <https://jamanetwork.com/journals/jamanetworkopen/fullarticle/2782991> (Year: 2021).

* cited by examiner

SMART MIRROR WITH MAKEUP LOOK SUPERIMPOSITION AND GUIDED TRACING

FIELD OF THE INVENTION

The present invention relates generally to the field of cosmetics and, more specifically, to an intelligent mirror device that enables users to visualize and apply makeup by superimposing a desired makeup look on their face and providing guided tracing.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Applying makeup can be a challenging task for many individuals, especially when trying to recreate a specific look. The process often involves trial and error, and can be time-consuming and frustrating. Thus, there is a need for a system that simplifies this process and helps users to achieve their desired makeup look with ease.

SUMMARY

The present invention provides an intelligent mirror device that integrates a display, a camera, a projector, and image processing algorithms to superimpose a desired makeup look onto a user's face. The system enables the user to visualize the desired look in real-time and provides guided tracing to help the user apply makeup accurately and efficiently.

In one aspect, an intelligent mirror device is provided, comprising: a mirror having an integrated display component; a user interface; one or more sensors configured to capture real-time data associated with a face of a user; one or more processors; and one or more memories storing non-transitory computer-readable instructions that, when executed by the one or more processors, cause the one or more processors to: receive an indication of a makeup look selected by the user; analyze the real-time data associated with the face of the user in order to generate a three-dimensional map associated with the face of the user; identify one or more facial features of the face of the user on the three-dimensional map associated with the face of the user; and cause the user interface to provide, via the integrated display component, guidance associated with applying one or more cosmetic products to the facial features of the user in order to achieve the makeup look selected by the user, wherein the guidance is at least partially superimposed upon the face of the user in the mirror. The intelligent mirror device may include additional, less, or alternate elements, including those discussed elsewhere herein.

In another aspect, a computer-implemented method for operating an intelligent mirror device is provided. The method may include receiving, by one or more processors, an indication of a makeup look selected by a user; analyzing, by the one or more processors, real-time data associated with the face of the user captured by one or more sensors of the intelligent mirror device in order to generate a three-dimensional map associated with the face of the user; identifying, by the one or more processors, one or more facial features of the face of the user on the three-dimensional map associated with the face of the user; and causing, by the one or more processors, a user interface of the intelligent mirror device to provide, via an integrated display component of a mirror of the intelligent mirror device, guidance associated with applying one or more cosmetic products to the facial features of the user in order to achieve the makeup look selected by the user, wherein the guidance is at least partially superimposed upon the face of the user in the mirror. The method may include additional, less, or alternate actions, including those discussed elsewhere herein.

In still another aspect, a non-transitory computer-readable storage medium storing instructions for operating an intelligent mirror device is provided. The instructions, when executed by one or more processors, may cause the one or more processors to perform a method comprising: receiving an indication of a makeup look selected by a user; analyzing real-time data associated with the face of the user captured by one or more sensors of the intelligent mirror device in order to generate a three-dimensional map associated with the face of the user; identifying one or more facial features of the face of the user on the three-dimensional map associated with the face of the user; and causing a user interface of the intelligent mirror device to provide, via an integrated display component of a mirror of the intelligent mirror device, guidance associated with applying one or more cosmetic products to the facial features of the user in order to achieve the makeup look selected by the user, wherein the guidance is at least partially superimposed upon the face of the user in the mirror. The instructions may direct additional, less, or alternative functionality, including that discussed elsewhere herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

There are shown in the drawings arrangements which are presently discussed, it being understood, however, that the present embodiments are not limited to the precise arrangements and instrumentalities shown, wherein.

Figure 1:
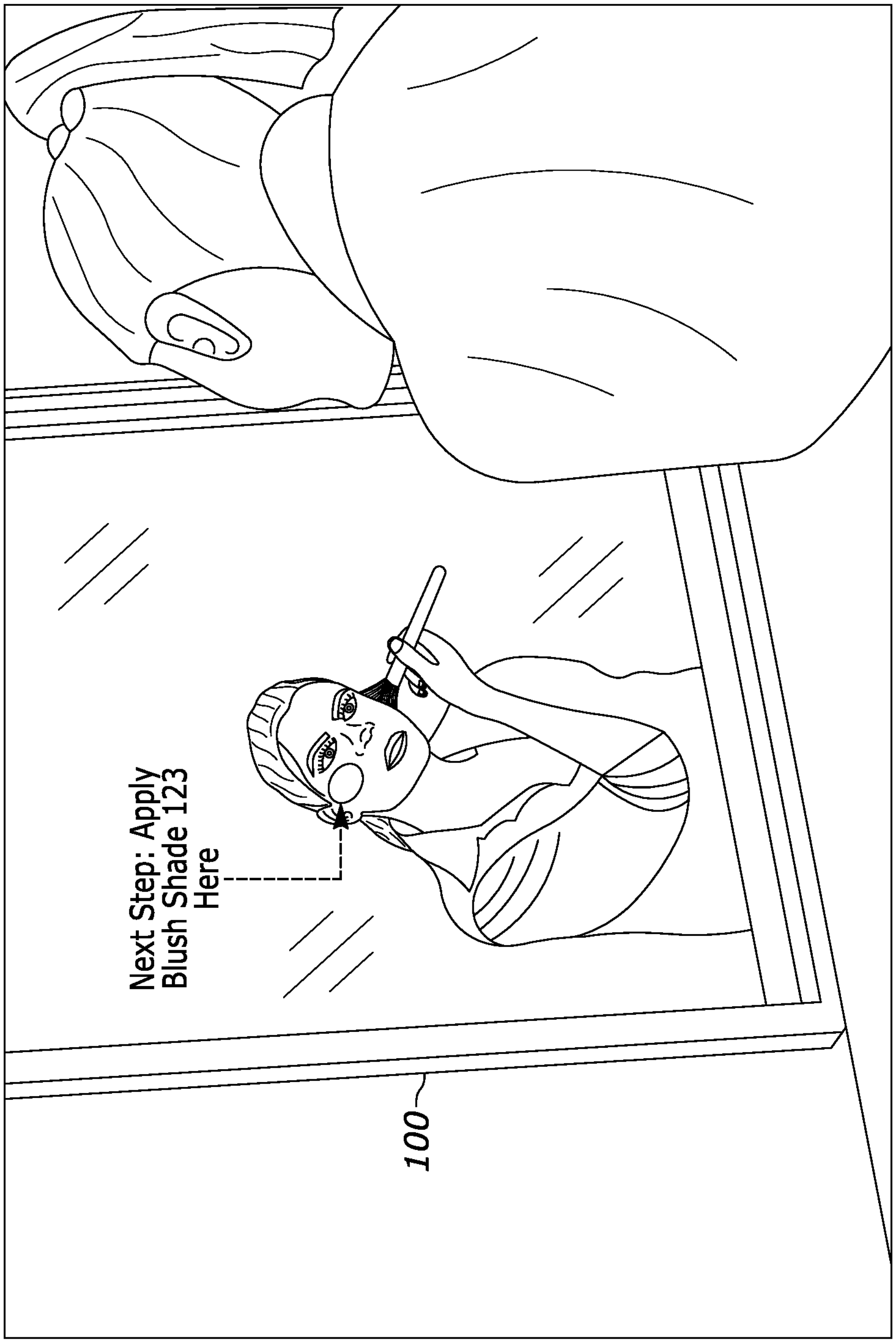
FIG. 1 depicts an exemplary intelligent mirror device, according to some embodiments.

While the systems and methods disclosed herein is susceptible of being embodied in many different forms, it is shown in the drawings and will be described herein in detail specific exemplary embodiments thereof, with the understanding that the present disclosure is to be considered as an exemplification of the principles of the systems and methods disclosed herein and is not intended to limit the systems and methods disclosed herein to the specific embodiments illustrated. In this respect, before explaining at least one embodiment consistent with the present systems and methods disclosed herein in detail, it is to be understood that the systems and methods disclosed herein is not limited in its application to the details of construction and to the arrangements of components set forth above and below, illustrated in the drawings, or as described in the examples.

Methods and apparatuses consistent with the systems and methods disclosed herein are capable of other embodiments and of being practiced and carried out in various ways. Also, it is to be understood that the phraseology and terminology employed herein, as well as the abstract included below, are for the purposes of description and should not be regarded as limiting.

DETAILED DESCRIPTION

Overview

The present disclosure provides a smart mirror system and method for superimposing a desired makeup look onto a user's face and providing guided tracing. The system comprises a mirror with an integrated display, a camera, a projection device, and a computing unit. The camera captures real-time images of the user's face, while the computing unit processes the images to identify facial features and detect the user's facial structure. The system allows the user to select a desired makeup look from a preloaded library or upload a custom look. The selected look is then superimposed on the user's face as it appears in the mirror in real-time, adjusting for facial features and orientation. The computing unit also provides guided tracing by generating step-by-step instructions and visual cues to help the user apply makeup accurately and efficiently. The smart mirror may employ machine learning (ML) and/or artificial intelligence (AI) to personalize user experiences and offer makeup recommendations. The smart mirror may use AR for virtually trying on makeup looks and feedback for guiding makeup application. The smart mirror may also be integrated with smart devices and smart packaging for enhanced functionality, and may include a feature for users to subscribe to, download, and share makeup looks on social media platforms.

The smart mirror's software may include an operating system, application programming interfaces (APIs), ML and AI algorithms, AR software, and/or social media integration capabilities.

The ML and AI algorithms may be designed to learn the user's preferences, skin type, and face shape, among other factors, to provide personalized makeup recommendations. The algorithms may be trained and updated over time to improve their accuracy and functionality. The AR software may enable users to virtually try on different makeup looks before applying them. The AR software may use the smart mirror's camera and the user's facial data to create a realistic virtual model of the user's face, onto which different makeup looks can be projected.

The feedback mechanisms may be designed to guide the user's makeup application by providing feedback superimposed over the user's face in the smart mirror, in real-time.

The smart mirror may communicate with smart devices and smart packaging via wireless communication protocols, which may enable the smart mirror to, for example, automatically update its ML and AI algorithms based on data from the smart devices or smart packaging, or to alert the user when they are running low on a particular type of makeup.

In some examples, users may subscribe to, download, and/or share makeup looks on social media platforms directly from the smart mirror. These features may be facilitated by the smart mirror's wireless communication hardware and social media APIs.

The user interface of the smart mirror may be designed to be intuitive and user-friendly, with clear, easy-to-understand icons and menus. The interface may allow users to easily navigate through the mirror's features and settings, and may include options for adjusting the smart mirror's ML, AI, and AR settings, among others.

Example Intelligent Mirror Device

FIG. 1 depicts an exemplary intelligent mirror device 100, according to some embodiments. As discussed in greater detail below with respect to FIG. 2, an intelligent mirror device 100 may include sensors configured to capture real-time data associated with a user's face as well as a user interface configured to receive an indication of a makeup look selected by a user and provide guidance associated with applying one or more cosmetic products to the facial features of the user in order to achieve the makeup look selected by the user, based on the real-time data captured by the sensors. The intelligent mirror device 100 may include a mirror and an integrated display configured to provide guidance, previews of looks, other information, etc. as projections upon the mirror. For instance, the user interface may provide guidance and/or previews of looks via the integrated display such that the guidance and/or previews of looks are overlaid upon and/or superimposed upon the face of the face of the user as it appears in the mirror.

For example, as shown in FIG. 1, the mirror of the intelligent mirror device 100 reflects the face of a user as she applies makeup. The integrated display may provide guidance that appears on the mirror, including some guidance that is superimposed upon the face of the user as it appears reflected in the mirror. For instance, as shown in FIG. 1, the guidance includes guidance about the next step in the application of a makeup look selected by the user, which includes guidelines and an arrow indicating where exactly to apply a particular cosmetic product on the face of the user, superimposed upon the face of the user as it appears in the mirror, such that a user may trace the guidelines in the area indicated by the arrow with a cosmetic applicator to apply the cosmetic product to the user's face.

Example System

Figure 2:
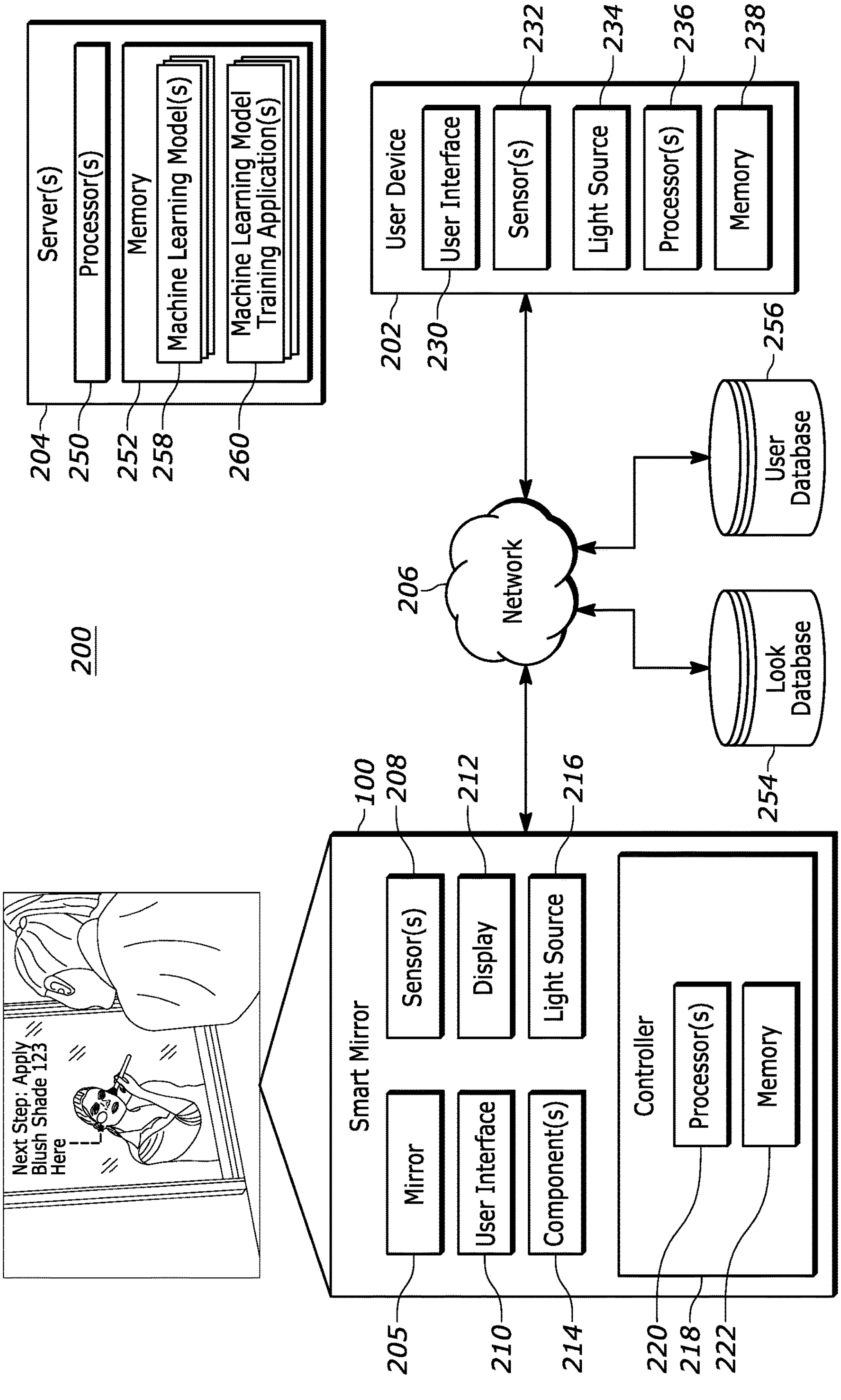
FIG. 2 depicts an exemplary computer system associated with an intelligent mirror device, according to some embodiments.

FIG. 2 depicts an exemplary computer system 200 for operating an intelligent mirror device, according to one embodiment. The high-level architecture illustrated in FIG. 2 may include both hardware and software applications, as well as various data communications channels for communicating data between the various hardware and software components, as is described below.

The system 200 may include an intelligent mirror device 100 as well as, in some cases, one or more user computing devices 202 (which may include, e.g., smart phones, smart watches or fitness tracker devices, tablets, laptops, virtual reality headsets, smart or augmented reality glasses, wearables, etc.), and/or one or more server(s) 204. The intelligent mirror device 100, user device(s) 202, and/or server(s) 204 may be configured to communicate with one another via a wired or wireless computer network 206, and/or via short range signals, such as BLUETOOTH signals.

Although one intelligent mirror device 100, one user device 202, one server 204, and one network 206 are shown in FIG. 2, any number of such intelligent mirror devices 100, user devices 202, servers 204, and networks 206 may be included in various embodiments. To facilitate such communications, the intelligent mirror device 100, user devices 202, and/or servers 204 may each respectively comprise a wireless transceiver to receive and transmit wireless communications.

The intelligent mirror device 100 may include a mirror 205, one or more sensors 208, one or more user interfaces 210, an integrated display 212 configured to project or otherwise provide information, guidance, etc., on the mirror 206, one or more components 214, and/or one or more light sources 216 configured to provide light to the face of the user. Additionally, the intelligent mirror device 100 may include a controller 218, including one or more processor(s) 220, as well as one or more computer memories 222.

Generally speaking, the sensors 208 may be configured to capture real-time data associated with the face of a user before, during, and/or after a user applies a cosmetic product to the user's face. The sensors 208 may include, for instance, a camera and/or a depth sensor configured to capture data associated with the user's face, data associated with various cosmetic products to be applied to the user's face and/or their packaging, etc. Moreover, the sensors 208 may include sensors (e.g., the camera and/or the depth sensor, or additional or alternative sensors) configured to capture biometric data associated with the user, such as facial recognition data, fingerprint recognition data, iris recognition data, etc.

The user interface 210 may be configured to receive inputs and selections from the user of the intelligent mirror device 100, and/or to provide audible or visual feedback to the user of the intelligent mirror device 100, including instructions, guidance, tutorials, etc., associated with the user applying cosmetic products to the user's face for a particular makeup look selected by the user. The user interface 210 may provide visual feedback via the integrated display 212, which may include a projector to project the visual feedback upon the mirror 205 (e.g., from the back of the mirror).

Figure 3A:
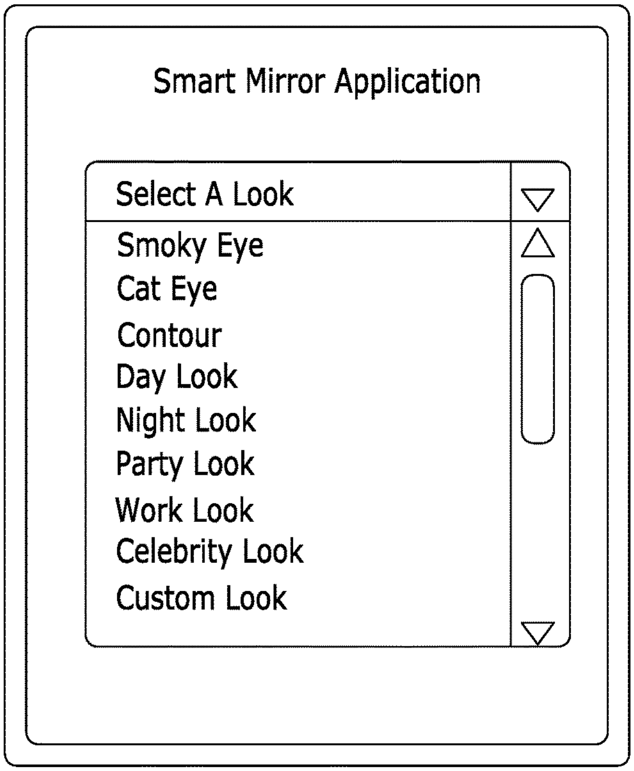
FIGS. 3A-3C depict examples of displays as may be provided by a user interface associated with an intelligent mirror device, according to some embodiments.
Figure 3B:
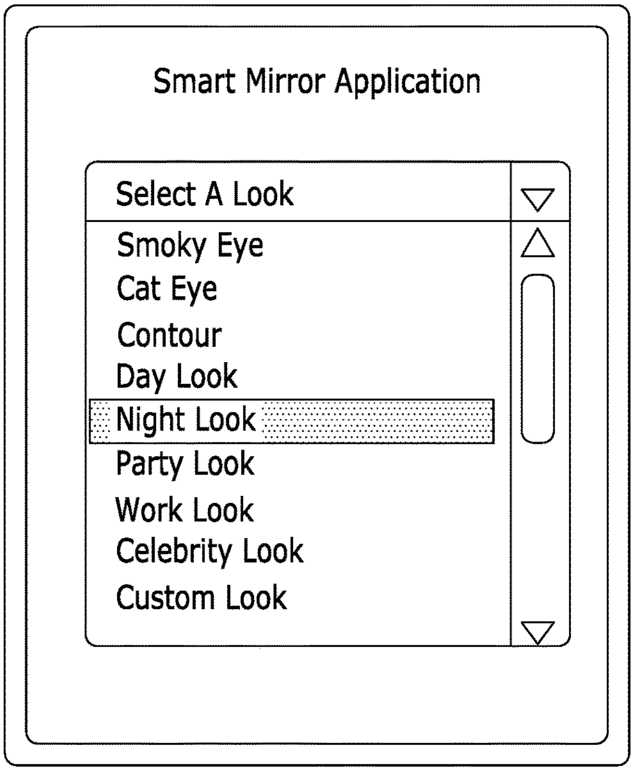
Figure 3C:
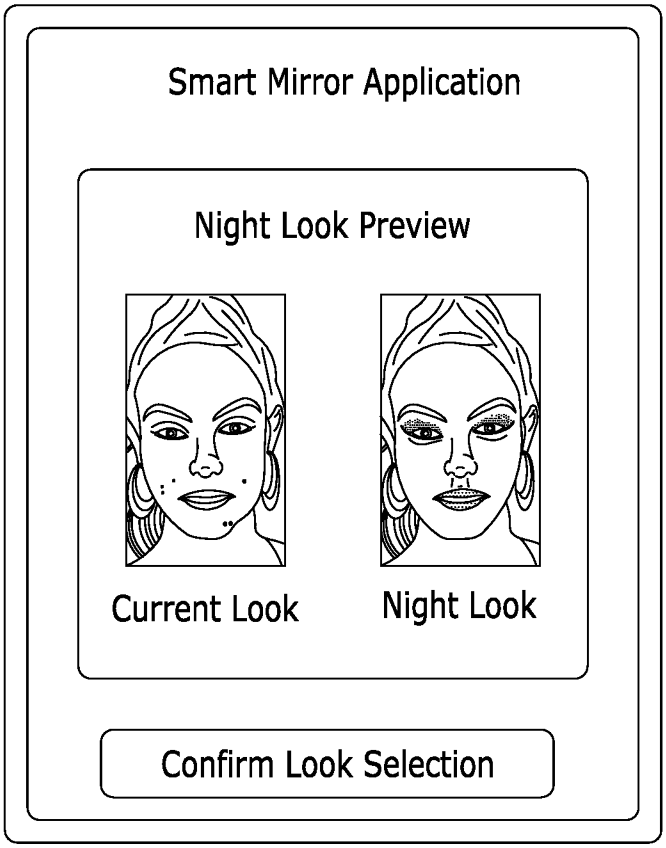

For instance, the user interface 210 may provide interactive displays via which users may select a desired makeup look to be applied to the face of the user. Examples of such displays are shown at FIGS. 3A-3C below. The user may select a pre-existing look or may create a custom look. The selected look may be associated with various parameters and/or specifications that the intelligent mirror device 100 may use to provide guidance to the user so that the user can apply cosmetic products to his or her face to achieve the selected look. Additionally, the user may provide an image or a social media link which may be analyzed to determine the parameters and/or specifications that the intelligent mirror device 100 may use to provide guidance to the user so that the user can apply cosmetic products to his or her face to achieve the selected look. For instance, these specifications may include types of makeup applied to each area of the face, heaviness of makeup applied to each area of the face, particular patterns, shapes, or borders of makeup applied to each area of the face, layers of makeup applied to each area of the face, etc.

The intelligent mirror device 100 may provide step-by-step audible and/or visual guidance to the user indicating, for instance, which cosmetic product to use, which applicator to use, where the cosmetic product should be applied, how many coats should be applied, how the cosmetic product should be blended with other products, patterns/shapes/motions to be used when applying the cosmetic product, etc. In some examples, this step-by-step guidance may be provided in real-time as the user applies or attempts to apply the cosmetic products to his or her face. In particular, the visual guidance may include visual indication (guidelines, arrows, or other trace lines) of a location on the face of the user where the cosmetic product should be applied, superimposed upon the face of the user as it appears in the mirror 205, that the user can trace with a cosmetic applicator to apply the cosmetic product.

Moreover, in some examples, the intelligent mirror device 100 may analyze the sensor data to determine that the user has completed a step, and may accordingly automatically proceed to a subsequent step in the guidance. Additionally, in some examples, the intelligent mirror device 100 may determine that a user is having difficulty completing a step (e.g., based on the way that the cosmetic products are applied to the user's face, and/or based on the way that the user is attempting to apply the cosmetic products to the user's face), and may accordingly provide additional guidance (e.g., additional guidance for removing an incorrectly applied cosmetic product, additional guidance regarding recommended techniques, additional guidance regarding adjustments to actions being performed by the user, additional guidance for selecting a less challenging look, etc.).

In some examples, the user interface 210 may further include an augmented reality (AR) component configured to generate and display an AR rendering of three-dimensional map of the user's face, and/or a selected makeup look as predicted to appear when applied to the user's face. For example, in some cases, the AR rendering may be overlaid upon an image or video of the user's face as captured in real-time by the sensors 208 or 232, to illustrate the appearance of the selected makeup look as applied to the user's face as it appears in the mirror 205. In some examples, the guidance may be provided via the AR component, e.g., such that an overlay upon an area of the user's face as it appears in the mirror 205 may be highlighted to illustrate that a cosmetic product should be applied to that area. For example, a trace of a cat-eye look may be overlaid upon the user's eyelids as they appear in the mirror 205 via the AR component, such that the user may apply an eyeliner product over the trace in order to apply the eyeliner product to the user's eyes to achieve the cat-eye look. As another example, certain areas of the user's cheekbones, chin, forehead, nose, etc., as they appear in the mirror 205 may be highlighted in an overlay provided via the AR component, such that the user may apply a contouring product, such as a blush or bronzer, in the areas shown in the overlay to achieve a contoured look.

Moreover, in some examples, the user interface 210 may be configured to receive feedback from a user associated with a selected makeup look after the selected makeup look is applied by the user. Furthermore, the user interface 210 may provide additional alerts, notifications, communications, etc., as discussed elsewhere herein.

The memories 222 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 222 may store an operating system (OS) (e.g., iOS, Microsoft Windows, Linux, UNIX, etc.) capable of facilitating the functionalities, apps, methods, or other software as discussed herein.

Generally speaking, the memorie(s) 222 may store instructions that, when executed by the processor(s) 220, cause the processors 220 to receive an indication of a makeup look selected by a user (e.g., from a user interface 210 of the intelligent mirror device 100, or from a user interface 230 of an associated user device 202), and instructions that, when executed by the controller 218, cause the intelligent mirror device 100 to provide guidance via a user interface for a user to apply a cosmetic product based on the selected makeup look.

Furthermore, the memorie(s) 222 may store instructions that, when executed by the processor(s) 220, cause the processor(s) 220 to analyze images associated with cosmetic products to identify particular cosmetic products or characteristics thereof. For instance, the memorie(s) 222 may store instructions that, when executed by the processor(s) 220, cause the processor(s) 220 to capture image data (e.g., via the sensors 208 and/or sensors 232) associated with packaging of various cosmetic products (i.e., cosmetic products to be added to integrated dispensers of the intelligent mirror device, and/or cosmetic products stored separately from the intelligent mirror device), and analyze the image data associated with the packaging of the various cosmetic products to identify respective cosmetic products based on their packaging. For instance, in some examples, this analysis may include using object recognition techniques to identify a likely type of cosmetic product and/or likely properties associated with the cosmetic product based on the image. Moreover, in some examples, this analysis may include analyzing an image of the cosmetic product packaging using optical character recognition techniques to identify one or more letters, numbers, words, codes, etc., on the cosmetic product packaging, and accessing a database associated with cosmetic products to match any identified letters, numbers, words, codes, etc., on the cosmetic product packaging with particular cosmetic products and/or particular properties associated therewith. As another example, this analysis may include analyzing an image of the cosmetic product packaging to identify and/or decode a barcode, QR code, etc. For instance, the payload of the barcode, QR code, etc., may include an identification or indication of the cosmetic product and/or properties associated therewith.

In particular, the instructions stored on the memorie(s) 222 may cause the processors 220 to analyze real-time sensor data captured by the sensors 208 (and/or external sensors, such as sensors 232 of a user device 202) in order to generate a three-dimensional map associated with the user's face and identify the locations of one or more facial features (e.g., eyes, eyelids, eyebrows, eyelashes, cheeks, cheekbones, nose, lips, chin, etc.) of the user's face on the three-dimensional map.

Additionally, the instructions stored on the memorie(s) 222 may cause a user interface 210 to provide audible or visible feedback, guidance, or tutorials to the user in real-time as the user applies the makeup look, or may send such feedback, guidance, or tutorials to another device (such as the user device 202) for display via the user interface of that device (e.g., the user interface 230).

Moreover, the instructions stored on the memorie(s) 222 may cause the controller 218 to adjust the feedback based on conditions associated with the user's skin as detected in real-time, e.g., based on data captured by the sensors 208 or sensors 232. For instance, the instructions stored on the memorie(s) 222 may cause the processor(s) 220 to analyze image data captured by the sensors 208 or sensors 232 to detect blemishes of the user's skin, and may, for instance, cause the controller 218 to adjust the feedback to guide the user's actions such that additional cosmetic products or additional coats of cosmetic products, and/or special cosmetic products specifically designed for blemishes, are applied to the affected area. Furthermore, in some examples, the instructions stored on the memorie(s) 222 may cause the processor(s) 220 to analyze image data captured by the sensors 208 or sensors 232 to detect skin health conditions, injuries, reactions, etc., of the user's skin, and may, in some cases, cause the controller 218 to adjust the feedback to guide the user to cease applying the cosmetic products or applies the cosmetic products in a manner to avoid further irritating or injuring any detected skin health conditions, injuries, reactions etc. Furthermore, in some examples, the instructions stored on the memorie(s) 222 may cause the processor(s) 220 to generate an alert based on the detected skin health condition, injury, reaction, etc., and provide the alert, e.g., via a user interface 210 and/or via the user interface 230.

Furthermore, in some examples, the instructions stored on the memorie(s) 222 may cause the processor(s) 220 and/or the controller 218 to perform any or all of the steps of the method 400 discussed below with respect to FIG. 4.

The user device 202 may include, or may be configured to communicate with, a user interface 230, which may receive input from users and may provide audible or visible output to users in a similar manner as discussed above with respect to the user interface 210 of the intelligent mirror device 100. Furthermore, the user device 202 may include, or may be configured to communicate with, one or more respective sensors 232, which may include similar sensors and/or sensor functionality as discussed above with respect to the sensors 208 of the intelligent mirror device 100. Additionally, the user device 202 may include, or may be configured to communicate with one or more light sources 234 configured to provide light to the face of the user of the intelligent mirror device 100. Furthermore, in some examples, the user device 202 may include one or more components 233.

Moreover, the user device 202 may include one or more processor(s) 236, as well as one or more computer memories 238. Memories 238 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 238 may store an operating system (OS) (e.g., iOS, Microsoft Windows, Linux, UNIX, etc.) capable of facilitating the functionalities, apps, methods, or other software as discussed herein. The memorie(s) 238 may store instructions that, when executed by the processor(s) 236, cause the processor(s) 236 to receive input from a user as provided via the user interface 230 (e.g., via interactive user interface display screens discussed below with respect to FIGS. 3A-3C), and send the received user input to the intelligent mirror device 100 (e.g., via the network 206), in some cases responsive to a request for such user input from the intelligent mirror device 100. Moreover, in some examples, the memorie(s) 238 may store instructions that, when executed by the processor(s) 236, cause the processor(s) 236 to receive, from the intelligent mirror device 100 (and/or from the server(s) 204), indications of guidance to be provided to the user for applying one or more cosmetic products to achieve a look selected by the user, and may in turn provide the received guidance audible and/or visibly via the user interface 230, and/or via the component(s) 233. Furthermore, in some examples, the memorie(s) 238 may store instructions that, when executed by the processor(s) 236, cause the processor(s) 236 to capture sensor data via one or more sensors 232, in some cases responsive to a request for particular sensor data from the intelligent mirror device 100, and may send the captured sensor data to the intelligent mirror device 100. Moreover, in some examples, the memorie(s) 238 may store instructions that, when executed by the processor(s) 236, cause the processor(s) 236 to provide light to the face of the user via a light source 234, in some cases responsive to a request from the intelligent mirror device 100 to provide light to the face of the user. In some examples, the request may include a request for a particular lighting parameters, such as a particular level/intensity of light, or a particular warmth or color of light, and the processor(s) 236 may in turn cause the light source 234 to provide the requested level/intensity, color, warmth, etc. of light to the face of the user.

Furthermore, in some examples, the instructions stored on the memorie(s) 238 may cause the processor(s) 236 to perform any or all of the steps of the method 400 discussed below with respect to FIG. 4.

In some embodiments the server 204 may comprise one or more servers, which may comprise multiple, redundant, or replicated servers as part of a server farm. In still further aspects, such server(s) 204 may be implemented as cloud-based servers, such as a cloud-based computing platform. For example, such server(s) 204 may be any one or more cloud-based platform(s) such as MICROSOFT AZURE, AMAZON AWS, or the like. Such server(s) 204 may include one or more processor(s) 250 (e.g., CPUs) as well as one or more computer memories 252.

The memories 252 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 252 may store an operating system (OS) (e.g., Microsoft Windows, Linux, UNIX, etc.) capable of facilitating the functionalities, apps, methods, or other software as discussed herein. The memorie(s) 252 may store one or more machine learning models 258, and/or one or more respective machine learning model training applications 260. These machine learning models 258 may include, for instance, a machine learning model trained to analyze data associated with a user's face and/or a three-dimensional map associated with the user's face to identify facial features thereon, a machine learning model trained to analyze images associated with makeup looks to identify cosmetic products and/or techniques used to create the makeup looks, a machine learning model trained to analyze data associated with the user's skin to identify a skin type or a skin health condition associated with the user, a machine learning model trained to analyze data associated with previous makeup looks selected by a user to predict additional makeup looks for the user, etc.

Additionally, or alternatively, the memorie(s) 252 may store makeup look data, and/or user data. The makeup look data may include, for instance, guidance, tutorials, etc., associated with various makeup looks, and may also be stored in a look database 254 (or in multiple such databases), which may be accessible or otherwise communicatively coupled to the server 204. The user data may include previous makeup looks worn by the user, user preferences, and various other data associated with the user, and may also be stored in a user database 256 (or in multiple such databases), which may be accessible or otherwise communicatively coupled to the server 204. Furthermore, in some examples, the makeup look data and the user data may be stored in the same database, which may be accessible or otherwise communicatively coupled to the server 204.

Furthermore, the memorie(s) 252 may store instructions that, when executed by the processors 250, cause the processors 250 to receive data from various databases such as the databases 254 and 256, and/or data from the intelligent mirror device 100 and/or the user device 202 (e.g., via the network 206). The data from the intelligent mirror device 100 and/or the user device 202 may include, for instance, data captured by the sensors 208 of the intelligent mirror device 100 and/or data captured by the sensors 232 of the user device 202, data input by a user via a user interface 210 of the intelligent mirror device and/or data input by a user via the user interface 230 of the user device 202, etc. The instructions stored on the memorie(s) 252, when executed by the processors 250, may cause the processors 250 to analyze data received from the database, and/or the intelligent mirror device 100 and/or the user device 202 in order to make an identification or a prediction based on the received data, and subsequently send the identification and/or prediction to the intelligent mirror device 100 and/or the user device 202. For instance, this analysis and identification and/or prediction may be based upon applying a trained machine learning model 258 to the data received from the databases and/or the intelligent mirror device 100 and/or the user device 202.

In some examples, one or more machine learning model(s) 258 may be executed on the server 204, while in other examples one or more machine learning model(s) 258 may be executed on another computing system, separate from the server 204. For instance, the server 204 may send data to another computing system, where a trained machine learning model 258 is applied to the data, and the other computing system may send a prediction or identification, based upon applying the trained machine learning model 258 to the data, to the server 204. Moreover, in some examples, one or more machine learning model 258 (s) may be trained by respective machine learning model training application(s) 260 executing on the server 204, while in other examples, one or more machine learning model(s) 258 may be trained by respective machine learning model training application(s) executing on another computing system, separate from the server 204.

Whether the machine learning model(s) 258 are trained on the server 204 or elsewhere, the machine learning model(s) 258 may be trained by respective machine learning model training application(s) 260 using training data (including historical data in some cases), and the trained machine learning model(s) 258 may then be applied to new/current data that is separate from the training data in order to determine, e.g., predictions and/or identifications related to the new/current data.

For example, a machine learning model 258 trained to analyze data associated with a user's face and/or a three-dimensional map associated with the user's face to identify facial features thereon may be trained by a machine learning model training application 260 using training data including images of various faces and/or three-dimensional maps associated with the various faces, and indications of locations of facial features in the images and/or three-dimensional maps. For instance, each image and/or three-dimensional map may be labeled to indicate locations of facial features such as the eyes, eyelids, eyebrows, eyelashes, cheeks, cheekbones, nose, lips, chin, etc. on the face, and these labeled images and/or three-dimensional maps may be used as training data. Once sufficiently trained using this training data, such a machine learning model 258 may be applied to a new image, video, and/or three-dimensional map associated with a user's face (e.g., an image or video captured by the sensors 208, 232, etc., in real-time), and may identify likely locations of various facial features of the user's face.

As another example, a machine learning model 258 trained to analyze images associated with makeup looks to identify cosmetic products and/or techniques used to create the makeup looks may be trained by a machine learning model training application 260 using training data including images of individuals with various makeup looks applied, and indications of cosmetic products and/or techniques that were used to create the looks shown in the images. For instance, an image of an individual wearing a particular makeup look may be labeled with a particular color or brand of mascara, blush, lipstick, foundation, etc., used to create the look, as well as types of applicators used to create the look, number of coats/layers of each cosmetic product, techniques such as motions, patterns, shapes, or lines used to create the look, etc., and these labeled images may be used as training data. Once sufficiently trained using this training data, such a machine learning model 258 may be applied to a new image, such as an image provided by a user via a user interface 210 and/or a user interface 230, or an image from a social media link provided by the user via the user interface 210 and/or a user interface 230, and may identify/predict cosmetic products and/or techniques that may be used to replicate the makeup look shown in the image. In some examples, the machine learning model 258 may further generate guidance, including step-by-step guidance, to be used by the intelligent mirror device 100 when providing guidance, instructions, tutorials, feedback, etc., for replicating the makeup look shown in the image.

Moreover, as another example, a machine learning model 258 trained to analyze data associated with the user's skin to identify a skin type or a skin health condition associated with the user may be trained by a machine learning model training application 260 using training data including images or other sensor data associated with various individuals' skin, and indications of skin types, skin health conditions, or other skin characteristics associated with the various individuals' skin. For instance, images of individuals having various skin types may be labeled with the respective skin types shown in each image. Similarly, images of individuals having various skin health conditions may be labeled with an indication of the health condition, the location of visual indicators associated with the health condition shown in the image, etc. Furthermore, images of individuals having various skin characteristics may be labeled with the respective skin characteristics. These labeled images may be used as training data, and once sufficiently trained using this training data, such a machine learning model 258 may be applied to a new image, video, and/or three-dimensional map associated with a user's face (e.g., an image or video captured by the sensors 208, 232, etc., in real-time), and may identify/predict a skin type, skin health condition, and/or other skin characteristic associated with the user's face.

Additionally, as another example, a machine learning model 258 trained to analyze data associated with previous makeup looks selected by a user to predict additional makeup looks for the user may be trained by a machine learning application 260 using training data including makeup looks selected by previous users, characteristics of the previous users, input/feedback from the previous users about the makeup looks, once applied by an intelligent mirror device 100, etc. For instance, various makeup looks may be labeled with indications of characteristics of users who gave positive feedback regarding the makeup looks, indications of other looks receiving positive feedback from the same users, etc. Once sufficiently trained using this training data, such a machine learning model 258 may be applied to a user, the user's characteristics, and previous makeup looks selected/liked by the user, and may predict/suggest other makeup looks that the user may enjoy.

In various aspects, the machine learning model(s) 258 may comprise machine learning programs or algorithms that may be trained by and/or employ neural networks, which may include deep learning neural networks, or combined learning modules or programs that learn in one or more features or feature datasets in particular area(s) of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques.

In some embodiments, the artificial intelligence and/or machine learning based algorithms used to train the machine learning model(s) 258 may comprise a library or package executed on the server 204 (or other computing devices not shown in FIG. 2). For example, such libraries may include the TENSORFLOW based library, the PYTORCH library, and/or the SCIKIT-LEARN Python library.

Machine learning may involve identifying and recognizing patterns in existing data (such as training a model based upon historical data) in order to facilitate making predictions or identification for subsequent data (such as using the machine learning model on new/current data order to determine a prediction or identification related to the new/current data).

Machine learning model(s) may be created and trained based upon example data (e.g., "training data") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based upon the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

In addition, memories 252 may also store additional machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For instance, in some examples, the computer-readable instructions stored on the memory 252 may include instructions for carrying out any of the steps of the method 400 via an algorithm executing on the processors 250, which is described in greater detail below with respect to FIG. 4. It should be appreciated that one or more other applications may be envisioned and that are executed by the processor(s) 252. It should be appreciated that given the state of advancements of mobile computing devices, any or all of the processes functions and steps described herein may be present together on a mobile computing device, such as the user device 202, or the intelligent mirror device 100.

Example User Interface Displays

FIGS. 3A-3C depict exemplary user interface displays as may be provided by a user interface of the intelligent mirror device (e.g., the user interface 210 of the intelligent mirror device 100) and/or of an associated user device (e.g., the user interface 230 of the user device 202). For instance, FIG. 3A illustrates an example user interface display via which a user may select a makeup look, and FIG. 3B illustrates an example user interface display via which a user has already selected a makeup look. For instance, the user may select between pre-set options such as "smoky eye," "cat eye," "contour," "day look," "night look," "party look," "work look," "celebrity look," etc. In some examples, the pre-set options may differ based on, for instance, whether a user is subscribed to a makeup look subscription service, or whether the user is operating the intelligent mirror device 100 in a "professional" mode compared to an "amateur" mode. Some of these options may include still-further options (not shown)—for instance, a user may select a specific celebrity for a "celebrity look," or may select options for each facial feature to create a custom look. These options may include, for instance, types of products applied, how heavily each of the products are applied to each facial area, etc. Furthermore, in some examples, the user may be prompted to upload an image of a desired look, or a link to a social media post including a desired look, which may be analyzed to generate tutorials, instructions, feedback, etc., associated with the desired look for use by the intelligent mirror device 100 when providing guidance to the user for applying the desired look.

FIG. 3C illustrates an example preview of the look selected by the user at FIG. 3B. In some examples, the preview may be a generalized preview, e.g., illustrating examples of other individuals to whom the look has been applied, or illustrating examples of a three-dimensional rendering of the look as applied to a three-dimensional model of a face. As shown in FIG. 3C, the preview includes a rendering of the user's current look and a rendering of a predicted look including a prediction of the selected makeup look as applied to the user's face. Furthermore, as shown in FIG. 3C, the preview includes an option to confirm the selected look. Upon confirming the selected look, the specifications associated with the selected look may be sent to the intelligent mirror device 100 so that the intelligent mirror device 100 may provide guidance for the user to apply the selected look to the user's face.

Example Method

Figure 4:
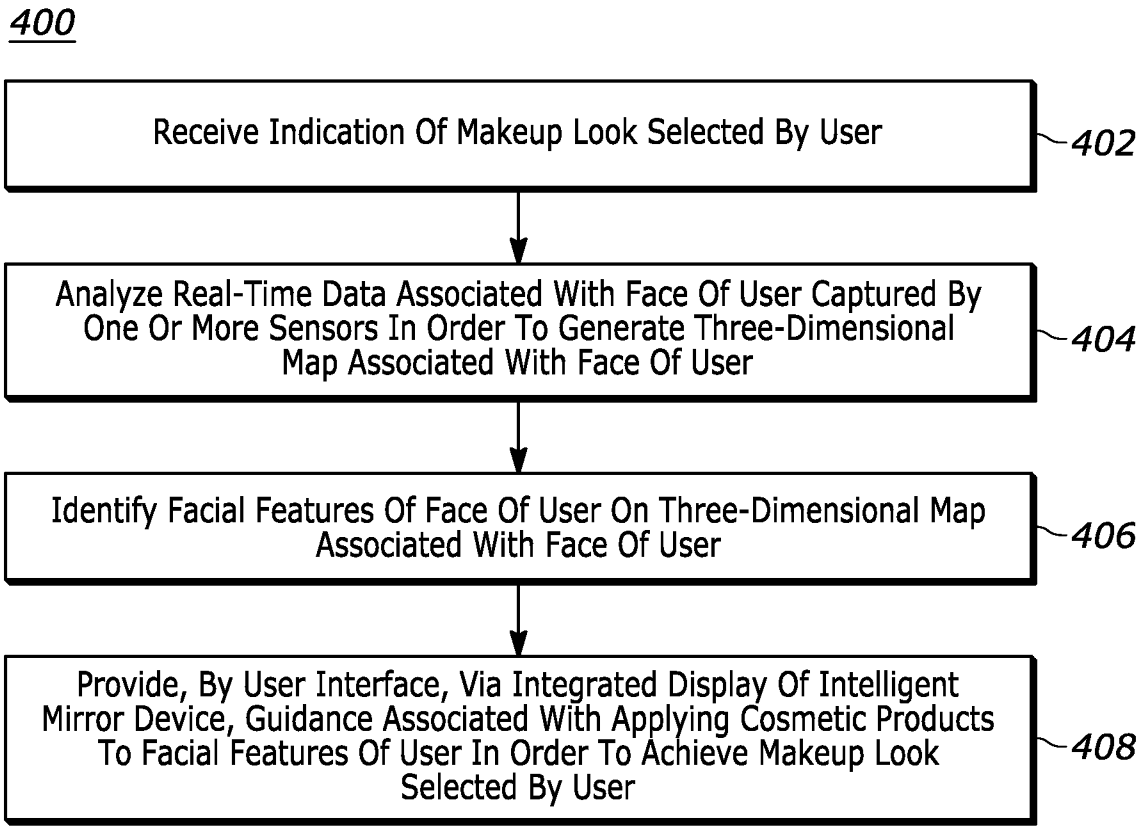
FIG. 4 depicts a flow diagram of an exemplary computer-implemented method for operating an intelligent mirror device according to some embodiments.

FIG. 4 depicts a flow diagram of an exemplary computer-implemented method for operating an intelligent mirror device, according to one embodiment. One or more steps of the method 400 may be implemented as instructions stored on a computer-readable memory (e.g., memory 222, memory 238, memory 252, etc.) and executable on one or more processors (e.g., processor 220, processor 236, processor 250, etc.).

The method 400 may include receiving (block 402), from a user interface (e.g., the user interface 210 and/or the user interface 230 discussed with respect to FIG. 2) associated with the intelligent mirror device, an indication of a makeup look selected by the user. In some examples, the user interface (e.g., the user interface 210) via which the user selects the makeup look may be integrated into the intelligent mirror device, while in other examples, the user interface (e.g., the user interface 230) may be part of a separate device, such as a user device (e.g., the user device 202, as discussed with respect to FIG. 2), and/or another separate device. In embodiments in which the user interface is part of a separate device, receiving the indication of the makeup look selected by the user may include the intelligent mirror device receiving the indication of the makeup look selected by the user at a communication interface of the intelligent mirror device, e.g., via a network (e.g., network 206), via a short range signal between the separate device and the intelligent mirror device, and/or via a wired connection between the separate device and the intelligent mirror device.

For instance, the user interface may provide a listing of possible makeup looks from which the user may select a makeup look. In some examples, the listing of possible makeup looks may include an indication of which makeup looks have previously been selected by the user. Moreover, in some examples, the listing of possible makeup looks may be modified (to include more looks, fewer looks, or otherwise different looks) based on whether the user is subscribed to a makeup look subscription service. Additionally, in some examples, the listing of possible makeup looks may include an indication of one or more suggested makeup looks for the user. For example, the method 400 may include providing suggested makeup looks for the user based on previous looks selected by the user, based on current trends associated with one or more makeup looks, based on a mood of the user, based on preferences indicated by the user, based on an indication, from the user, of an event or setting at which the user will be wearing the makeup look, based on a time of day or year, etc.

In some examples, providing suggested makeup looks for the user based on previous looks selected by the user may include applying a trained machine learning model to previously selected looks in order to identify a suggested look for the user. For instance, the method 400 may include training a machine learning model using historical data associated with makeup looks selected by other users, and feedback associated therewith. Once trained, the machine learning model may be capable of predicting a makeup look for a user based on previous makeup looks selected by the user.

In some examples, prior to proceeding to the further steps of the method 400, the method 400 may include analyzing biometric data (e.g., retina data, fingerprint data, facial identification, etc.) associated with the user (e.g., as captured by one or more integrated sensors, or sensors of a separate device) in order to determine whether the user is an authorized user of the intelligent mirror device. If the user is an authorized user of the intelligent mirror device, the method 400 may proceed, but if the user is not an authorized user of the intelligent mirror device, the method 400 may not proceed further, i.e., such that the operation of the intelligent mirror device is restricted to only authorized users. Moreover, upon identifying the user (whether using biometric data or otherwise), the intelligent mirror device may provide customized guidance, recommendations, feedback, etc. based on the identity of the user. That is, multiple users in the same household may each use the same intelligent mirror device, but may receive different (personalized) guidance, recommendations, feedback, etc.

Furthermore, the method 400 may include analyzing (block 404) real-time data associated with the face of the user captured by one or more sensors in order to generate a three-dimensional map associated with the face of the user. For instance, the sensors may include integrated sensors of the intelligent mirror device (e.g., sensors 208, as discussed with respect to FIG. 2). Additionally, the sensors may include sensors of a separate device, such as a user device (e.g., sensors 232 of the user device 202, as discussed with respect to FIG. 2), and/or another separate device. The sensors may include, for instance, cameras or depth sensors, or other suitable sensors.

In embodiments in which the sensors include sensors that are part of a separate device, the intelligent mirror device may request sensor data from, and/or receive sensor data captured by, the sensors of the separate device via a communication interface of the intelligent mirror device, e.g., via a network (e.g., network 206), via a short range signal between the separate device and the intelligent mirror device, and/or via a wired connection between the separate device and the intelligent mirror device.

Additionally, in some examples, the intelligent mirror device, and/or a separate device, may include one or more light sources (e.g., light source 216, and/or the light source 234). In such examples, the method 400 may include controlling light sources integrated into or otherwise connected to the intelligent mirror device to provide light to the face of the user as the sensor data is being captured, or sending a request to the separate device to cause the separate device to activate a light source to provide light to the face of the user as the sensor data is being captured, e.g., via a network (e.g., network 206), via a short range signal between the separate device and the intelligent mirror device, and/or via a wired connection between the separate device and the intelligent mirror device. For instance, in some examples, the method 400 may include determining optimized lighting parameters, such as an optimized level, warmth, and/or direction of light to be provided based on the selected makeup look, based on a particular cosmetic product being used, based on a particular step within the process of the selected makeup look being applied, and/or based on ambient lighting conditions in an area where the intelligent mirror device is being used, and may control an integrated light source to provide the optimized light level, warmth, and/or direction of light, or send a request to the separate device to provide the optimized light level, warmth, and/or direction of light.

In some examples, the method 400 may include generating an augmented reality (AR) version of the three-dimensional map of the face of the user, and displaying the AR version of the three-dimensional map of the face of the user via a user interface associated with the intelligent mirror device. As discussed above, in some examples, the user interface may be integrated into the intelligent mirror device, and the AR version of the three-dimensional map of the face of the user may be displayed by the user interface of the intelligent mirror device, i.e., via an integrated display. In some examples, displaying the AR version of the three-dimensional map of the face of the user may include sending the AR version of the three-dimensional map of the face of the user to the separate device to be displayed by the user interface of the separate device, e.g., via a network (e.g., network 206), via a short range signal between the separate device and the intelligent mirror device, and/or via a wired connection between the separate device and the intelligent mirror device.

Additionally, the method 400 may include identifying (block 406) one or more facial features of the face of the user on the three-dimensional map associated with the face of the user. In some examples, this analysis may include applying a trained machine learning model to the three-dimensional map associated with the face of the user to identify the facial features. For instance, the method 400 may include training a machine learning model using historical three-dimensional maps associated with other faces, and corresponding portions of the three-dimensional maps associated with facial features of the other faces, and, once trained, the machine learning model may be capable of identifying such facial features on three-dimensional maps associated with new faces. That is, the trained machine learning model may be configured to recognize facial geometry associated with particular facial features on the three-dimensional map associated with a face. Certain facial geometry on a particular location of the face may correspond to the eyes of the face, while other facial geometry at another location of the face may correspond to the lips of the face, etc.

Moreover, in some examples, the method 400 may include generating a preview of the makeup look selected by the user as applied to facial features of the face of the user on the three-dimensional map associated with the face of the user. For instance, the method 400 may include generating an AR preview of the makeup look selected by the user as applied to facial features of the face of the user on the three-dimensional map associated with the face of the user, and/or may generate an AR preview of the makeup look selected by the user overlaid upon the user's real face as shown in the mirror of the intelligent mirror device in real-time. Furthermore, the method 400 may include generating an AR preview of the steps of the application process of the makeup look selected by the user to the facial features of the face of the user. For instance, the AR preview of the steps of the application process may include images associated with each step of the application process, and/or videos associated with each step of the application process, and in some examples may be overlaid upon the user's real face as shown in the mirror of the intelligent mirror device in real-time. The method 400 may further include displaying the AR preview of the selected makeup look, and/or the AR preview of the steps of the application process for the selected makeup look, by a user interface of the intelligent mirror device, via an integrated display. In embodiments in which the user interface is part of a separate device, the method 400 may include sending the AR preview to the separate device to be displayed by the user interface of the separate device, e.g., via a network (e.g., network 206), via a short range signal between the separate device and the intelligent mirror device, and/or via a wired connection between the separate device and the intelligent mirror device.

Furthermore, the method 400 may include providing (block 408) audio and/or visual guidance associated with applying one or more cosmetic products to the facial features of the user in order to achieve the makeup look selected by the user. The visual guidance may be provided by the user interface of the intelligent mirror device, via an integrated display. The integrated display may project or otherwise provide the guidance to be displayed on the mirror. For example, the integrated display may provide the guidance such that certain aspects of the guidance are superimposed upon the user's face as it appears in the mirror in real-time, so that the user can trace guidelines or areas to apply various cosmetic products to their face.

For instance, the guidance may include user instructions, support, tutorials, etc., associated with the operation of the intelligent mirror device, and may include an indication of one or more steps of a cosmetic application process, including which cosmetic products (types of products, brands, colors, etc.) should be used at each step, which applicators should be used at each step, a recommended motion to be used for each step, a number of layers to be used at each step, etc. The applicators may include, for instance, a brush applicator, a sponge applicator, a puff applicator, a pencil applicator, a felt tip applicator, a marker applicator, a crayon applicator, a lip stick applicator, a lip gloss applicator, a roller applicator, a mascara wand applicator, and/or any other suitable applicator for applying cosmetic products to the face of the user. Furthermore, the guidance may include audible guidance, and/or visual guidance (including AR guidance), and may be provided via a user interface of the intelligent mirror device and/or via another associated user interface (such as a user interface of an associated mobile device). The guidance may be provided by the integrated display of the intelligent mirror device such that the guidance is overlaid upon the user's real face as shown in the mirror of the intelligent mirror device in real-time.

For example, the method 400 may include analyzing the sensor data in real-time as the user completes each step of the guidance to determine when the user has completed a step. Determining that a step of the guidance has been completed may include analyzing the motions of the user to determine that the user has performed a particular motion associated with applying a cosmetic product to a particular area of the user's face, and/or analyzing the user's face to determine whether colors, textures, etc., of the user's face have been modified in a manner consistent with applying a particular cosmetic product to a particular area of the user's face. For instance, if a step of the guidance included the user applying blush, this analysis may include analyzing the motions of the user to determine whether the user held a blush brush to their cheek and performed a sweeping motion up the cheekbone consistent with the application of blush, and/or analyzing the user's face to determine that the user's cheekbones have become more pink or red in a manner consistent with the application of the blush product. In other examples, the user may verbally indicate that he or she has completed a particular step. In any case, once the user completes a step of the guidance, the user interface may provide the next step of the guidance.

Additionally, the method 400 may further include analyzing the sensor data in real-time to identify properties of the skin of the user, properties of the environment of the user, and/or properties of the one or more cosmetic products being applied, and automatically adjusting the feedback provided based on one or more of: a skin type associated with the user, a skin health condition associated with the user, a hydration level of the skin of the user, a skin tone associated with the user, current temperature conditions, current humidity conditions, current precipitation conditions, current lighting conditions, a current time of day, and/or one or more properties associated with the one or more cosmetic products being applied. In some examples, this analysis may include applying a trained machine learning model to the sensor data to identify the properties of the skin of the user, the properties of the environment of the user, and/or the properties of the one or more cosmetic products being applied. For instance, the method 400 may include training a machine learning model using historical sensor data associated with skin properties, environmental properties, cosmetic product properties, etc., and, once trained, the machine learning model may be capable of identifying such properties based on new sensor data.

Additionally or alternatively, in some examples, the method 400 may include automatically controlling a feedback component of the intelligent mirror device to provide feedback as guidance to a user using the intelligent mirror device. For example, the method 400 may include providing feedback in real-time as a user applies a cosmetic product, indicating one or more improvements or corrections suggested for the user.

In some examples, for instance, the feedback may be provided when the user has moved an applicator outside of a range associated with the makeup look selected by the user, such that the user may be alerted to move the applicator within the range associated with the selected makeup look. For instance, one type of feedback (and/or the absence of feedback) may be provided when the user uses the applicator to draws a straight line across a user's eyelid for a cat eye look, and another type of feedback (and/or the presence of feedback) may be provided when the user begins to draw a crooked line or otherwise veers from an initial straight line. As another example, a first type of feedback may be provided when the user holds an applicator too close to the eye to apply mascara, a second type of feedback (or the same type of feedback as the first type of feedback) may be provided when the user holds the applicator too far from the eye to apply mascara, and a third type of feedback (or the absence of feedback) may be provided when the user holds the applicator the correct distance from the eye to apply mascara. As still another example, one type of feedback may be provided when the user presses an applicator too hard on the lips to apply lipstick in accordance with the selected look, and another type of feedback (or the absence of feedback) may be provided when the user presses the applicator to the lips with the correct level of pressure to apply lipstick in accordance with the selected look. For instance, the feedback may include audio feedback, an icon or phrase displayed via the integrated display of the intelligent mirror device, and/or AR feedback overlaid and/or superimposed on the user's face is it appears in the mirror, displayed via the integrated display of the intelligent mirror device.

Moreover, in some examples, the method 400 may further include analyzing the sensor data in real-time to identify blemishes of the skin of the user, and automatically adjusting the feedback, based on identified blemishes, i.e., beyond the initial parameters of the selected makeup look. For instance, the method 400 may include adjusting the guidance such that the user applies a different amount of particular cosmetic product, e.g., to add more foundation or concealer, to an area of the user's face including a blemish, in order to cover the blemish with the cosmetic product. Furthermore, in some examples, the method 400 may include analyzing the sensor data in real-time to determine whether the blemish is sufficiently covered based on an initial application of the cosmetic product, and may include automatically adjusting the guidance and/or feedback such that the user adds additional cosmetic product as needed until the blemish is sufficiently covered.

Additionally, in some examples, the method 400 may further include analyzing the sensor data in real-time to identify skin reactions of the skin of the user, and automatically generating alerts or notifications based on any identified skin reactions. For instance, the method 400 may include presenting such generated alerts via the integrated display of the intelligent mirror device, and/or sending such generated alerts to a separate device to be displayed via a user interface of the separate device.

Furthermore, in some examples, the method 400 may include capturing data associated with packaging of various cosmetic products (i.e., cosmetic products to be added to integrated dispensers of the intelligent mirror device, and/or cosmetic products stored separately from the intelligent mirror device), and analyzing the data associated with he packaging of the various cosmetic products to identify respective cosmetic products based on their packaging. For instance, in some examples, this analysis may include capturing an image of a cosmetic product package and using object recognition techniques to identify a likely type of cosmetic product and/or likely properties associated with the cosmetic product based on the image. Moreover, in some examples, this analysis may include analyzing an image of the cosmetic product packaging using optical character recognition techniques to identify one or more letters, numbers, words, codes, etc., on the cosmetic product packaging, and accessing a database associated with cosmetic products to match any identified letters, numbers, words, codes, etc., on the cosmetic product packaging with particular cosmetic products and/or particular properties associated therewith. As another example, this analysis may include analyzing an image of the cosmetic product packaging to identify and/or decode a barcode, QR code, etc. For instance, the payload of the barcode, QR code, etc., may include an identification or indication of the cosmetic product and/or properties associated therewith. Moreover, in some examples, the method 400 may include identifying a cosmetic product and/or properties associated therewith based on input provided by a user (e.g., input provided via an integrated user interface of the intelligent mirror device, and/or via a user interface of a separate device that is sent to the intelligent mirror device). The method 400 may further include adjusting the guidance and/or the feedback based on particular cosmetic products being applied, and/or properties associated therewith.

In some examples, the method 400 may further include receiving feedback associated with the makeup look from the user (e.g., via a user interface) subsequent to the application of the one or more cosmetic products to the face of the user, and storing the feedback associated with the makeup look. For instance, the method 400 may update one or more aspects of the makeup look in future applications based on feedback provided by the user.

Additionally or alternatively, in some examples the method 400 as discussed above may be performed in a similar manner for providing guidance associated with styling the user's hair. For instance, the intelligent mirror device may receive an indication of a hair look selected by the user, and may analyze real-time data associated with the hair of the user captured by sensors associated with the intelligent mirror device in order to generate a three-dimensional map associated with the hair of the user. The user interface of the intelligent mirror device may provide guidance associated with styling the user's hair to achieve the selected hair look, and this guidance may be at least partially superimposed upon the user's hair as it appears in the mirror. For instance, the guidance may visually indicate pieces of hair that should be clipped, put into hair ties, braided, curled, straightened, crimped, etc., and may visually demonstrate techniques that the user can follow in order to achieve the desired look.

Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" or "some embodiments" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for an intelligent mirror device, and/or systems, methods, and/or techniques associated therewith. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Aspects

1. An intelligent mirror device, comprising: a mirror having an integrated display component; a user interface; one or more sensors configured to capture real-time data associated with a face of a user; one or more processors; and one or more memories storing non-transitory computer-readable instructions that, when executed by the one or more processors, cause the one or more processors to: receive an indication of a makeup look selected by the user; analyze the real-time data associated with the face of the user in order to generate a three-dimensional map associated with the face of the user; identify one or more facial features of the face of the user on the three-dimensional map associated with the face of the user; and cause the user interface to provide, via the integrated display component, guidance associated with applying one or more cosmetic products to the facial features of the user in order to achieve the makeup look selected by the user, wherein the guidance is at least partially superimposed upon the face of the user in the mirror.
2. The intelligent mirror device of aspect 1, wherein the one or more sensors include one or more of a camera or a depth sensor.
3. The intelligent mirror device of any one of aspects 1 or 2, wherein the guidance includes a plurality of steps associated with applying one or more cosmetic products to the facial features of the user in order to achieve the makeup look selected by the user, and wherein the instructions, when executed by the one or more processors, further cause the one or more processors to: cause the user interface to provide, via the integrated display component, guidance associated with a first step of the plurality of steps; analyze the real-time data associated with the face of the user in order to determine that the first step of the plurality of steps has been completed by the user; and based on determining that the first step of the plurality of steps has been completed by the user, cause the user interface to provide, via the integrated display component, guidance associated with a second step of the plurality of steps.
4. The intelligent mirror device of any one of aspects 1-3, wherein the guidance includes tracing lines or arrows associated with applying one or more cosmetic products to the facial features of the user in order to achieve the makeup look selected by the user.
5. The intelligent mirror device of any one of aspects 1-4, wherein the user interface includes an audio component, and wherein providing guidance associated with applying the one or more cosmetic products to the facial features of the user includes providing audio guidance via the audio component.
6. The intelligent mirror device of any one of aspects 1-5, further comprising a communication interface configured to communicate with a mobile device, external to the intelligent mirror device.
7. The intelligent mirror device of aspect 6, wherein the communication interface is a wired communication interface.
8. The intelligent mirror device of aspect 6, wherein the communication interface is a wireless communication interface.
9. The intelligent mirror device of any one of aspects 1-8, wherein the user interface includes an augmented reality (AR) component configured to generate and display an AR version of the three-dimensional map associated with the face of the user, superimposed on the face of the user in the mirror, via the integrated display component.
10. The intelligent mirror device of aspect 9, wherein the non-transitory computer-readable instructions, when executed by the one or more processors, further cause the one or more processors to generate a three-dimensional preview of the makeup look selected by the user as applied to the three-dimensional map associated with the face of the user, and wherein the AR component is further configured to generate and display an AR version of the three-dimensional preview of the makeup look selected by the user as applied to the three-dimensional map associated with the face of the user, superimposed on the face of the user in the mirror, via the integrated display component.
11. The intelligent mirror device of aspect 10, wherein the three-dimensional preview of the makeup look selected by the user includes a three-dimensional preview of the application process of the makeup look selected by the user.
12. The intelligent mirror device of any one of aspects 1-11, further comprising a light source configured to provide light to the face of the user.
13. The intelligent mirror device of aspect 12, wherein the non-transitory computer-readable instructions, when executed by the one or more processors, further cause the one or more processors to control the light source to provide particular lighting conditions while the one or more cosmetic products are applied to the facial features of the user.
14. The intelligent mirror device of any one of aspects 1-13, wherein the instructions, when executed by the one or more processors, further cause the one or more processors to identify one or more blemishes of the face of the user on the three-dimensional map associated with the face of the user, and wherein providing, via the user interface, guidance associated with applying one or more cosmetic products to the facial features of the user is further based on the identified one or more blemishes of the face of the user.
15. The intelligent mirror device of any one of aspects 1-14, wherein providing, via the user interface, guidance associated with applying one or more cosmetic products to the facial features of the user is further based on a skin type associated with the user, a skin health condition associated with the user, a hydration level of the skin of the user, a skin tone associated with the user, current temperature conditions, current humidity conditions, current precipitation conditions, current lighting conditions, a current time of day, or one or more properties associated with the one or more cosmetic products.
16. The intelligent mirror device of any one of aspects 1-15, wherein the non-transitory computer-readable instructions, when executed by the one or more processors, further cause the one or more processors to: analyze the real-time data associated with the face of a user to identify a skin reaction associated with the application of the one or more cosmetic products; and provide an alert, via the user interface, based on the identified skin reaction.

17. The intelligent mirror device of any one of aspects 1-16, wherein the non-transitory computer-readable instructions, when executed by the one or more processors, further cause the one or more processors to analyze one or more of: the real-time data associated with the face of the user captured by the one or more sensors, or previously-captured data associated with the face of the user captured by the one or more sensors, in order to determine one or more of a skin type or skin health condition associated with the user.

18. The intelligent mirror device of aspect 17, wherein analyzing one or more of: the real-time data associated with the face of the user captured by the one or more sensors, or previously-captured data associated with the face of the user captured by the one or more sensors, in order to determine one or more of the skin type or the skin health condition associated with the user, includes applying a trained machine learning model to one or more of the real-time data associated with the face of the user captured by the one or more sensors, or previously-captured data associated with the face of the user captured by the one or more sensors, to determine one or more of the skin type or the skin health condition associated with the user.

19. The intelligent mirror device of aspect 18, wherein the non-transitory computer-readable instructions, when executed by the one or more processors, further cause the one or more processors to: obtain training data including data associated with faces of individuals as captured by one or more sensors, and corresponding skin types and/or skin health conditions associated with the respective individuals; and train a machine learning model, using the training data, to identify one or more of a skin type or a skin health condition associated with a new individual based on data associated with the face of the new individual as captured by one or more sensors, resulting in the trained machine learning model.

20. The intelligent mirror device of any one of aspects 1-19, wherein identifying the one or more facial features of the face of the user on the three-dimensional map associated with the face of the user includes applying a trained machine learning model to the three-dimensional map associated with the face of the user to identify the one or more facial features of the face of the user.

21. The intelligent mirror device of aspect 20, wherein the non-transitory computer-readable instructions, when executed by the one or more processors, further cause the one or more processors to: obtain training data including three-dimensional maps associated with faces of individuals and corresponding facial features of the faces of the respective individuals; and train a machine learning model, using the training data, to identify one or more facial features of a face of a new individual based on a three-dimensional map associated with the face of the new individual, resulting in the trained machine learning model.

22. The intelligent mirror device of any one of aspects 1-21, wherein the one or more sensors are further configured to capture data associated with packaging of the one or more cosmetic products, and wherein the non-transitory computer-readable instructions, when executed by the one or more processors, further cause the one or more processors to analyze the data associated with the packaging of the one or more cosmetic products to identify the one or more cosmetic products.

23. The intelligent mirror device of aspect 22, wherein identifying the one or more cosmetic products includes determining one or more properties associated with the one or more cosmetic products.

24. The intelligent mirror device of any one of aspects 1-23, wherein the one or more memories are further configured to store one or more makeup looks previously selected by the user.

25. The intelligent mirror device of any one of aspects 1-24, wherein receiving an indication of a makeup look selected by the user includes receiving an indication of a makeup look selected by the user from a plurality of makeup looks provided by a subscription service.

26. The intelligent mirror device of any one of aspects 1-25, wherein the non-transitory computer-readable instructions, when executed by the one or more processors, further cause the one or more processors to generate one or more suggested makeup looks for the user based on current trends associated with one or more makeup looks.

27. The intelligent mirror device of any one of aspects 1-26, wherein the non-transitory computer-readable instructions, when executed by the one or more processors, further cause the one or more processors to generate one or more suggested makeup looks for the user based on a mood and/or setting of the user.

28. The intelligent mirror device of aspect 27, wherein the non-transitory computer-readable instructions, when executed by the one or more processors, further cause the one or more processors to determine the mood of the user based on data associated with one or more of facial expressions, voice tone, or other behavioral cues, of the user, captured by the one or more sensors.

29. The intelligent mirror device of any one of aspects 1-28, wherein the non-transitory computer-readable instructions, when executed by the one or more processors, further cause the one or more processors to generate one or more suggested makeup looks for the user based on one or more makeup looks previously selected by the user.

30. The intelligent mirror device of any one of aspects 1-29, wherein generating one or more suggested makeup looks for the user based on one or more makeup looks previously selected by the user includes applying a trained machine learning model to the one or more makeup looks previously selected by the user to generate one or more suggested makeup looks for the user.

31. The intelligent mirror device of aspect 30, wherein the non-transitory computer-readable instructions, when executed by the one or more processors, further cause the one or more processors to: obtain training data including data associated with makeup looks previously selected by individuals, and corresponding subsequent makeup looks selected by respective individuals; and train a machine learning model, using the training data, to identify a suggested makeup look for a new individual based on data associated with makeup looks previously selected by the individual, resulting in the trained machine learning model.

32. The intelligent mirror device of aspect 31, wherein the non-transitory computer-readable instructions, when executed by the one or more processors, further cause the one or more processors to: receive feedback associated with the makeup look, subsequent to the application of the one or more cosmetics products to the facial features of the user, from the user, via the user interface, wherein feedback associated with a makeup look is included in the data associated with the makeup look.
33. The intelligent mirror device of any one of aspects 1-32, wherein the non-transitory computer-readable instructions, when executed by the one or more processors, further cause the one or more processors to: analyze biometric data associated with the user captured by the one or more sensors in order to determine whether the user is an authorized user; and restrict operation of the intelligent mirror device to authorized users only.
34. The intelligent mirror device of any one of aspects 1-33, wherein the non-transitory computer-readable instructions, when executed by the one or more processors, further cause the one or more processors to provide one or more user instructions, guidance, support, or tutorials associated with the operation of the intelligent mirror device, via the user interface.
35. The intelligent mirror device of any one of aspects 1-34, wherein the non-transitory computer-readable instructions, when executed by the one or more processors, further cause the one or more processors to operate in one or more modes associated with respective users or types of users.
36. The intelligent mirror device of any one of aspects 1-35, wherein the non-transitory computer-readable instructions, when executed by the one or more processors, further cause the one or more processors to receive an indication of a hair style selected by the user; and cause the user interface to provide, via the integrated display component, guidance associated with styling the hair of the user in order to achieve the hair style selected by the user, wherein the guidance is at least partially superimposed upon the user in the mirror.
37. A computer-implemented method for operating an intelligent mirror device, the method comprising: receiving, by one or more processors, an indication of a makeup look selected by a user; analyzing, by the one or more processors, real-time data associated with the face of the user captured by one or more sensors of the intelligent mirror device in order to generate a three-dimensional map associated with the face of the user; identifying, by the one or more processors, one or more facial features of the face of the user on the three-dimensional map associated with the face of the user; and causing, by the one or more processors, a user interface of the intelligent mirror device to provide, via an integrated display component of a mirror of the intelligent mirror device, guidance associated with applying one or more cosmetic products to the facial features of the user in order to achieve the makeup look selected by the user, wherein the guidance is at least partially superimposed upon the face of the user in the mirror.
38. A non-transitory computer-readable medium storing instructions for operating an intelligent mirror device that, when executed by one or more processors, cause the one or more processors to perform a method comprising: receiving an indication of a makeup look selected by a user; analyzing real-time data associated with the face of the user captured by one or more sensors of the intelligent mirror device in order to generate a three-dimensional map associated with the face of the user; identifying one or more facial features of the face of the user on the three-dimensional map associated with the face of the user; and causing a user interface of the intelligent mirror device to provide, via an integrated display component of a mirror of the intelligent mirror device, guidance associated with applying one or more cosmetic products to the facial features of the user in order to achieve the makeup look selected by the user, wherein the guidance is at least partially superimposed upon the face of the user in the mirror.

What is claimed is:

1. An intelligent mirror device, comprising:

a mirror having an integrated display component;

a user interface;

one or more sensors configured to capture real-time data associated with a face of a user;

one or more processors; and one or more non-transitory memories storing computer-readable instructions that, when executed by the one or more processors, cause the one or more processors to:

receive an indication of a makeup look selected by the user;

analyze the real-time data associated with the face of the user in order to generate a three-dimensional map associated with the face of the user;

identify one or more facial features of the face of the user on the three-dimensional map associated with the face of the user;

cause the user interface to provide, via the integrated display component, guidance associated with applying one or more cosmetic products to the one or more facial features of the user in order to achieve the makeup look selected by the user, wherein the guidance includes a first step of a plurality of steps, and wherein the guidance is at least partially superimposed upon the face of the user in the mirror;

analyze the real-time data associated with the face of the user in order to determine that the first step of the plurality of steps has been completed by the user; and based on determining that the first step of the plurality of steps has been completed by the user, cause the user interface to automatically provide, via the integrated display component, guidance associated with a second step of the plurality of steps.

2. The intelligent mirror device of claim 1, wherein the one or more sensors include one or more of a camera or a depth sensor.

3. The intelligent mirror device of claim 1, wherein the guidance includes tracing lines or arrows associated with applying the one or more cosmetic products to the one or more facial features of the user in order to achieve the makeup look selected by the user.

4. The intelligent mirror device of claim 1, wherein the user interface includes an audio component, and wherein providing guidance associated with applying the one or more cosmetic products to the one or more facial features of the user includes providing audio guidance via the audio component.

5. The intelligent mirror device of claim 1, further comprising a communication interface configured to communicate with a mobile device, external to the intelligent mirror device.

6. The intelligent mirror device of claim 5, wherein the communication interface is a wired communication interface.

7. The intelligent mirror device of claim 5, wherein the communication interface is a wireless communication interface.

8. The intelligent mirror device of claim 1, wherein the user interface includes an augmented reality (AR) component configured to generate and display an AR version of the three-dimensional map associated with the face of the user, superimposed on the face of the user in the mirror, via the integrated display component.

9. The intelligent mirror device of claim 8, wherein the computer-readable instructions, when executed by the one or more processors, further cause the one or more processors to generate a three-dimensional preview of the makeup look selected by the user as applied to the three-dimensional map associated with the face of the user, and wherein the AR component is further configured to generate and display the AR version of the three-dimensional preview of the makeup look selected by the user as applied to the three-dimensional map associated with the face of the user, superimposed on the face of the user in the mirror, via the integrated display component.

10. The intelligent mirror device of claim 9, wherein the three-dimensional preview of the makeup look selected by the user includes a three-dimensional preview of an application process of the makeup look selected by the user.

11. The intelligent mirror device of claim 1, further comprising a light source configured to provide light to the face of the user.

12. The intelligent mirror device of claim 11, wherein the computer-readable instructions, when executed by the one or more processors, further cause the one or more processors to control the light source to provide particular lighting conditions while the one or more cosmetic products are applied to the one or more facial features of the user.

13. The intelligent mirror device of claim 1, wherein the computer-readable instructions, when executed by the one or more processors, further cause the one or more processors to identify one or more blemishes of the face of the user on the three-dimensional map associated with the face of the user, and wherein providing, via the user interface, the guidance associated with applying the one or more cosmetic products to the one or more facial features of the user is further based on the identified one or more blemishes of the face of the user.

14. The intelligent mirror device of claim 1, wherein providing, via the user interface, the guidance associated with applying the one or more cosmetic products to the one or more facial features of the user is further based on a skin type associated with the user, a skin health condition associated with the user, a hydration level of skin of the user, a skin tone associated with the user, current temperature conditions, current humidity conditions, current precipitation conditions, current lighting conditions, a current time of day, or one or more properties associated with the one or more cosmetic products.

15. The intelligent mirror device of claim 1, wherein the computer-readable instructions, when executed by the one or more processors, further cause the one or more processors to:

analyze the real-time data associated with the face of the user to identify a skin reaction associated with an application of the one or more cosmetic products; and provide an alert, via the user interface, based on the identified skin reaction.

16. The intelligent mirror device of claim 1, wherein the computer-readable instructions, when executed by the one or more processors, further cause the one or more processors to analyze one or more of: the real-time data associated with the face of the user captured by the one or more sensors, or previously-captured data associated with the face of the user captured by the one or more sensors, in order to determine one or more of a skin type or skin health condition associated with the user.

17. The intelligent mirror device of claim 16, wherein analyzing one or more of: the real-time data associated with the face of the user captured by the one or more sensors, or the previously-captured data associated with the face of the user captured by the one or more sensors, in order to determine one or more of the skin type or the skin health condition associated with the user, includes applying a trained machine learning model to one or more of the real-time data associated with the face of the user captured by the one or more sensors, or the previously-captured data associated with the face of the user captured by the one or more sensors, to determine one or more of the skin type or the skin health condition associated with the user.

18. A computer-implemented method for operating an intelligent mirror device, the computer-implemented method comprising:

receiving, by one or more processors, an indication of a makeup look selected by a user;

analyzing, by the one or more processors, real-time data associated with a face of the user captured by one or more sensors of the intelligent mirror device in order to generate a three-dimensional map associated with the face of the user;

identifying, by the one or more processors, one or more facial features of the face of the user on the three-dimensional map associated with the face of the user;

causing, by the one or more processors, a user interface of the intelligent mirror device to provide, via an integrated display component of a mirror of the intelligent mirror device, guidance associated with applying one or more cosmetic products to the one or more facial features of the user in order to achieve the makeup look selected by the user, wherein the guidance includes a first step of a plurality of steps, and wherein the guidance is at least partially superimposed upon the face of the user in the mirror;

analyzing, by the one or more processors, the real-time data associated with the face of the user in order to determine that the first step of the plurality of steps has been completed by the user; and based on determining that the first step of the plurality of steps has been completed by the user, causing, by the one or more processors, the user interface to automatically provide, via the integrated display component, guidance associated with a second step of the plurality of steps.

19. A non-transitory computer-readable medium storing instructions for operating an intelligent mirror device that, when executed by one or more processors, cause the one or more processors to perform a method comprising:

receiving an indication of a makeup look selected by a user;

analyzing real-time data associated with a face of the user captured by one or more sensors of the intelligent mirror device in order to generate a three-dimensional map associated with the face of the user;

identifying one or more facial features of the face of the user on the three-dimensional map associated with the face of the user;

causing a user interface of the intelligent mirror device to provide, via an integrated display component of a mirror of the intelligent mirror device, guidance associated with applying one or more cosmetic products to the one or more facial features of the user in order to achieve the makeup look selected by the user, wherein the guidance includes a first step of a plurality of steps, and wherein the guidance is at least partially superimposed upon the face of the user in the mirror;

analyzing the real-time data associated with the face of the user in order to determine that the first step of the plurality of steps has been completed by the user; and based on determining that the first step of the plurality of steps has been completed by the user, causing the user interface to automatically provide, via the integrated display component, guidance associated with a second step of the plurality of steps.

* * * * *